Jan. 20, 1970  D. S. DAVIES  3,490,590
CARBON IN MEMBRANE SYSTEMS
Filed Jan. 2, 1968
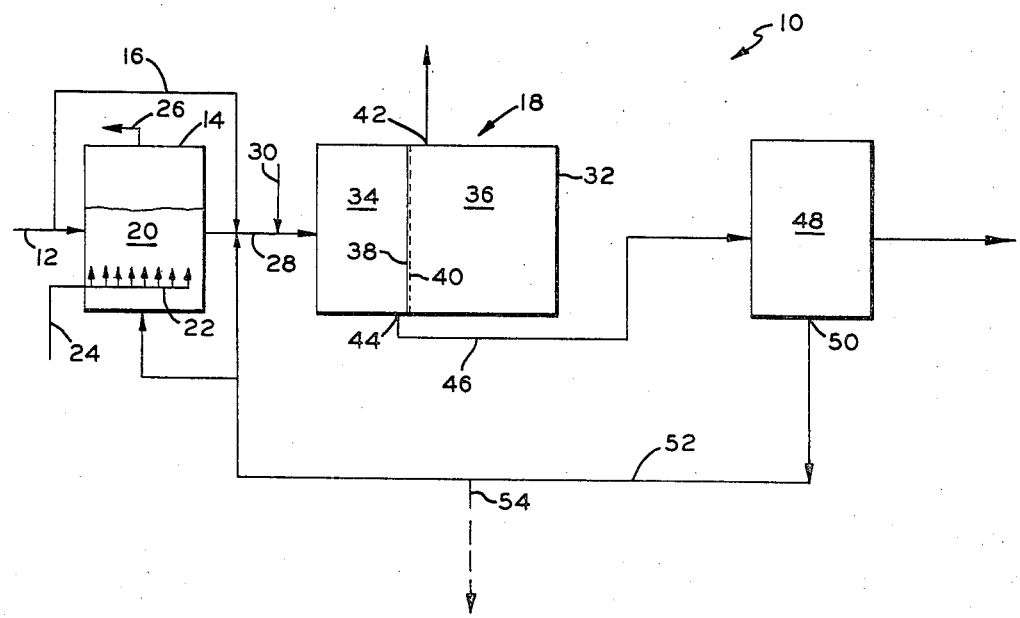
INVENTOR.
DAVID S. DAVIES
BY
ATTORNEY.

United States Patent Office

3,490,590
Patented Jan. 20, 1970

3,490,590
CARBON IN MEMBRANE SYSTEMS
David S. Davies, Richfield, Conn., assignor to Dorr-Oliver Incorporated, Stamford, Conn., a corporation of Delaware
Filed Jan. 2, 1968, Ser. No. 695,107
Int. Cl. B01d 13/00; C02c 1/02
U.S. Cl. 210—6    8 Claims

ABSTRACT OF THE DISCLOSURE

A membrane system for separating organic and inorganic constituents from a carrier liquid wherein carbon particles are added to the feed stream prior to the introduction of the feed stream to the membrane. The carbon adsorbs soluble organic constituents and slime generating grease from the stream thereby preventing pollution of the final effluent and fouling of the membrane pores.

---

The present invention concerns a novel system incorporating selectively-permeable membranes for separating liquid-carried particles from the carrier liquid. More particularly, the present invention relates to the application of such a system for separating organic waste and biological life forms from a carrier liquid.

Heretofore, biological life reaction systems have been dependent upon relatively inefficient phase separators, most frequently a clarifier, to separate the biological life and adsorbed nutrients from the effluent water. Recently, however, it has been suggested that a membrane based, reverse osmosis-ultrafiltration, system be used to perform the separation function. The proposed system incorporates one or more selectively permeable membranes each of which permits through-membrane transport of the carrier liquid while preventing through membrane flow of the biological life. Preferably, the proposed membrane system retains not only the biological forms, but also the large-moleculed, refractory or slowly-bio-degradable organic species. The additional removal of these components insures sufficient opportunity and time for the metabolic conversion of the organic substrates. In operation, a pressure drop across the membrane passes a portion of the carrier liquid through the membrane and out of the system as effluent, while the biological life and the major portion of the carrier liquid are retained on the feed side of the membrane, existing as the so-called concentrate. This concentrate is then re-circulated back across the membrane to permit further removal of the entrained particles and eventual clarification of the liquid.

While the membrance based system has been particularly well received, especially for small plant size waste treatment systems; for systems where gravity sedimentation cannot be used; or, where substantial credit can be given for reclamation of lost product and purity of carrier-liquid effluent, a number of operating difficulties have been encountered. One of the most significant problems is in the area of objectionable soluble organic materials which are capable of penetrating the more "open" types of membranes. This problem is of major importance when the concentration of these solids builds up in a system which recycles the concentrate. It not only pollutes the carrier-liquid effluent, which would otherwise be COD free, it may also remove from the system, a recoverable constituent of the concentrate stream. Another problem which has been equally as significant in the operation of a membrane separation system is the fouling of the membrane "pores" with suspended and colloidal particles. The drop in flux rate, i.e., gallons of throughflow per square foot of membrane per day, has in many instances been found to be almost exponential as slime builds up on the membrane surface and reduces the effective separating area of the system. Although, a membrane based separation system offers many distinct advantages for treatment of organic wastes, the frequency of shut downs necessary for cleaning and/or replacement of clogged membranes and the fluctuations in operating efficiency have raised considerable doubt as to a broader base of commercial applicability.

It is therefore a primary object of the present invention to provide a membrane based separation system which overcomes the above-enumerated disadvantages.

The present invention accomplishes this objective by adding an adsorbent material, preferably activated carbon, to the separation system upstream from the membrane separation unit. It has been found that the activated carbon performs two basic functions in the operation of the system. First, it removes by adsorption, the objectionable soluble organic materials before they are introduced to the separation unit, thereby cooperating with the system to remove all of the organics from the carrier-liquid. Secondly, the activated carbon function to remove the pore-foulants and slime generating greases, primarily by also adsorbing these influent constituents before they are introduced to the membrane unit. Furthermore, it has been found that the activated carbon will also remove slimes which deposit on the membrane surface. Applicant theorizes that the adsorptive attraction of the carbon particles is strong enough to, in effect, "pull" the slime off the membrane surface and onto the carbon particles.

Addition of activated carbon to the feed stream has also been shown to have distinct advantages during the start-up phase of the separation unit. During this initial period there are not enough biota formed in the system to effectively begin the metabolization process on the organic constituents in the incoming feed. This has always been a very difficult time in any activated sludge system, usually resulting in either a period of impure effluent or necessitating 100 percent recycle of the influent processed through the system during this period. The former alternative is objectionable because it is, in essence, discharging high COD effluent to the receiving stream. The second alternative is equally unattractive because it necessitates the inclusion of a holding tank for the influent processed during this period or an enlargement of the membrane separation unit to enable it to retain the feed until the proper biota population level is established. This problem is obviated when activated carbon is added to the feed; because during this period the activated carbon will substitute for the biota by adsorbing a large portion of the organic constituents of the feed. Furthermore, experimentation has shown, that the presence of activated carbon in the feed acts as a catalyst to enhance the multipliction rate of the biota population in the system. Thus, not only does the activated carbon substitute for the biota by adsorbing large portions of the organics during this critical period, it also shortens the start-up time by increasing the rate of biological life growth.

It is therefore another object of the present invention to add an adsorbent material to the mixture of incoming feed material and recycled concentrate prior to their introduction into the membrane separation unit.

It is yet another object of the present invention to add activated carbon to a membrane based separation system upstream from the membrane separation unit.

The subject matter which applicant regards as his invention is particularly pointed out and distinctly claimed in the concluding portion of this specification. The inventon, however, as to its organization and method of operation together with further objects and advantages thereof will best be understood by reference to the following description taken in conjunction with the accompanying drawing which is a diagrammatic flowsheet showing the novel system of the present invention.

Referring now to the drawing a water borne raw sewage influent is introduced to the waste treatment system 10 through conduit 12. The system may, as shown, contain a biological treatment station 14 or, alternatively, the feed stream can be transferred through conduit 16 directly to the membrane separation unit 18. The treatment station 14 contains a body of biological-life-carrying-liquid 20 and if the environment is to be aerobic, a diffuser 22 supplied by an oxygen source 24. A controlled vent 26 is positioned at the top of the biological treatment station to permit the escape of gases. The metabolic conversion of the nutrient values in the influent stream, be it either aerobically or anaerobically, is conducted in a known manner and the treated product is discharged through influent stream conduit 28 to the separation phase of the system.

At this state in the waste treatment process the influent to the membrane separation unit 18 contains an objectionable quantity of soluble organic materials which are capable of penetrating the more "open" types of membranes. The membranes used where activated diffusion is the dominant separating factor are generally amorphous polymeric materials which have considerable thermal motion and will "yield" to intruding particles. Heretofore, nothing could be done about the penetration of these soluble organics and as a result a completely COD free effluent was extremely difficult to obtain.

Another problem in the operation of membrane separation systems, which has been found to be equally as significant and troublesome as effluent pollution, is fouling of the "pores" of the membrane by suspended and colloidal particles contained in the influent stream. The curtailment of flux rate, i.e., gallons of throughflow per square foot of membrane surface per day, caused by the buildup of slime on the membrane surface has in many cases been found to be so rapid, requiring frequent shutdowns for cleaning and/or replacement, as to question the economic feasibility of the system.

Applicant has found that both of these problems can be obviated by the controlled addition of an adsorbent material, preferably activated carbon, to the feed material prior to its introduction to the membrane separation unit 18. To this end, a valved adsorbent supply conduit 30 discharges controlled amounts of activated carbon into influent stream conduit 28. Conduit 30 is positioned sufficiently upstream from the membrane separation unit to allow for intimate mixture of the influent and the adsorbent before they reach the separation phase of the system. Thus, the activated carbon, which is preferably powdered for maximum surface area, can adsorb the offensive soluble organics before they present a problem in the membrane separation unit. The exact amount of carbon added to the system per gallon of influent in the system is largely dependent upon the desired COD removal rate, the milligrams per liter of COD in the influent stream and the quantity of the soluble organics in the influent. The relationship between carbon and influent may, however, be expressed in terms of a Freundlich isotherm.

Separation unit 18 comprises a suitable pressure housing 32 which is, in turn, divided into a feed section 34 and and effluent section 36 by at least one, and preferably a bank of, selectively-permeable membranes 38. The characteristics of the membranes are selected for the performance of a reverse osmosis-ultrafiltration separation wherein a pressure drop across the membrane causes the biological life to be retained in the feed section 34 and a portion of the carrier liquid to be passed through to the effluent section 36. Each of the membranes is supported, on the effluent side of the housing, by a perforated plate 40 which prevents the membranes from being buckled by the pressure differential.

As stated above, the second major problem in the operation of a membrane separation unit is the clogging of the "pores" of the membrane by colloidal and suspended particles contained in the influent. However, the presence of activated carbon in the feed section stream also obviates this problem, because the carbon will also adsorb the pore-foulant and slime-generating grease constituents of the influent before they contact the membrane surfaces. It has also been found that the the carbon particles have enough adsorptive attraction to, in effect, "pull" any slime which does form on the membrane surface, from the membrane surface, and onto the carbon particles. Thus, the introduction of an adsorbent, preferably activated carbon, to the influent stream prior to its entry into the membrane separation unit serves a two-fold purpose. First, the activated carbon cooperates with the membrane system, as a unit, to remove the objectionable soluble organics which the membranes acting alone, cannot remove. Second, the activated carbon cooperates with the individual membranes to keep their surfaces clean, by adsorbing the foulants before they get to the membrane surface and by "adsorbing-off" any slimes which do form on the membranes.

Housing 32 is provided with an effluent section outlet 42 for the clarified water and a feed section outlet 44 for the concentrated product. Outlet 44 discharges the mixture of concentrated product and activated carbon into conduit 46, which, in turn, empties into a carbon recovery unit 48. The carbon, which may be regenerated by any known method, may then be returned to the system through conduit 30. The concentrated feed is discharged from the recovery unit through outlet 50 and recycled for further processing through conduit 52. If the system contains a biological treatment station 14, a portion of the concentrated product may be diverted from conduit 52 into the body of biological-life-carrying liquid 20 to seed and maintain the body.

The remainder of the concentrated product is discharged from conduit 52 into influent stream conduit 28, where it is mixed with fresh influent and redosed with activated carbon from conduit 30 before being reintroduced to the feed system of the separation unit. A bleed conduit 54 is positioned along conduit 52 to prevent overloading of the system with biological solids and to maintain the load ratio of BOD to biological solids.

I claim:

1. A process for treating a liquid stream containing soluble and insoluble organic constituents comprising the steps of:
   (a) introducing the stream to a first zone containing biological life capable of metabolizing said organic constituents;
   (b) introducing a predetermined quantity of activated carbon to the first zone and intimately mixing the activated carbon and the stream, the activated carbon adsorbing at least a portion of the soluble organic constituents of the stream;
   (c) circulating the activated carbon and the stream past one side of a selectively-permeable membrane for operatively retaining the organic constituents and the activated carbon on one side of the membrane while permitting through membrane transport of the carrier liquid;
   (d) establishing a pressure-drop across the membrane from a first side thereof to a second side thereof to force through membrane transport of the carrier liquid so as to concentrate the organic constituent containing stream;
   (e) withdrawing the carrier liquid from the second side of the membrane as an effluent stream; and
   (f) returning at least a portion of the concentrated organic stream to said first zone.

2. A process for maintaining a high flux rate across a membrane surface comprising the steps of:
   (a) introducing a liquid-solid mixture to be separated to a first zone containing liquid-carried biological life;

(b) introducing a predetermined quantity of activated carbon particles to the first zone and intimately mixing the carbon and the liquid-solid mixture;

(c) introducing the carbon and liquid-solid mixture to a second zone containing at least one membrane surface and circulating the carbon and the liquid-solid mixture past one side of the membrane surface for operatively concentrating the solid constituents on one side of the membrane while permitting through membrane transport of the carrier liquid;

(d) transferring the carbon particles past the membrane surface to remove at least a portion of the caked solids adhering thereto;

(e) establishing a pressure-drop across the membrane from one side thereof to the other side thereof to force through-membrane transport of the carrier liquid;

(f) discharging the concentrated solid constituents and carbon particles from the second zone and transporting them to a third zone;

(g) removing at least a portion of the carbon particles from the concentrated solid constituents; and (h) returning at least a portion of the concentrated solid constituents to said first zone.

3. A process for maintaining a high flux rate across a membrane surface as defined in claim 2 further comprising the step of separately recirculating at least a portion of the carbon particles from the third zone to said first zone.

4. A process for treating an organic waste containing liquid stream having soluble and unsoluble organic constituents comprising the steps of:

(a) introducing the waste stream to a first zone containing a body of biological life, the organic constituents of the waste stream supplying nutrients for the biological life;

(b) removing a biological-life-containing stream from the first zone and transferring it to a second zone;

(c) introducing a predetermined quantity of activated carbon to the second zone and intimately mixing the activated carbon and the biological-life-containing stream, the activated carbon adsorbing at least a portion of the soluble organic constituents of the waste stream;

(d) feeding the mixture of the activated carbon and the biological-life-containing stream to a third zone containing at least one selectively-permeable membrane and circulating the mixture past one side of the membrane for concentrating the biological-life and activated carbon on one side of the membrane while permitting through membrane transport of the carrier liquid;

(e) establishing a pressure-drop across the membrane from one side thereof to the other side thereof to force through-membrane transport of the carrier liquid;

(f) withdrawing the carrier liquid from the third zone as an effluent stream; and (g) returning at least a portion of the concentrated stream from said third zone to said first zone.

5. A process as defined in claim 4 further comprising the step of returning at least a portion of the concentrated stream from said third zone to said second zone.

6. A process as defined in claim 4 further comprising the steps of transferring at least a major portion of the concentrated stream to a fourth zone, removing at least a portion of the activated carbon from the concentrated stream, and returning at least a portion of the remaining concentrated stream to said first zone.

7. A process as defined in claim 6 further comprising the step of returning at least a portion of the remaining concentrated stream from said fourth zone to said second zone.

8. A process as defined in claim 6 further comprising the step of transferring at least a portion of the activated carbon removed from the concentrated stream in said fourth zone to said second zone.

References Cited

UNITED STATES PATENTS

| | | | |
|---|---|---|---|
| 3,186,917 | 6/1965 | Gerhardt et al. | 210—321 X |
| 3,228,876 | 1/1966 | Mahon | 210—321 X |
| 3,244,621 | 4/1966 | Bouthilet | 210—39 X |
| 3,268,441 | 8/1966 | Lindstrom | 210—39 X |
| 3,373,056 | 3/1968 | Martin | 210—23 X |
| 3,398,088 | 8/1968 | Okey | 210—23 X |

FOREIGN PATENTS 452,000  8/1936  Great Britain.

OTHER REFERENCES

Kolobow et al.: "Dialysate Capacity Augmentation at Ultra-Low Flow Rates With Activated Carbon Slurry," from Trans. Amer. Soc. Artif. Int. Organs, vol. XII, pp. 1–5.

"Potable Water Recovered From Urine by Filtration," from Chemical and Engineering News, Apr. 6, 1964, pp. 50–51.

SAMIH N. ZAHARNA, Primary Examiner

F. A. SPEAR, JR., Assistant Examiner

U.S. Cl. X.R.

210—18, 23, 39